United States Patent [19]

Menashi et al.

[11] Patent Number: 5,589,531
[45] Date of Patent: Dec. 31, 1996

[54] PREPARATION AND USE OF PELLETIZED SUBMICRON PIGMENT POWDER/POLYMER COMPOSITIONS

[75] Inventors: Jameel Menashi; Robert C. Reid; Robert S. Whitehouse, all of Lexington; David J. Kaul, Acton, all of Mass.

[73] Assignee: Cabot Corporation, Boston, Mass.

[21] Appl. No.: 399,475

[22] Filed: Mar. 7, 1995

[51] Int. Cl.$^6$ ................................................. C08K 3/10
[52] U.S. Cl. .................. 524/409; 524/432; 524/437; 524/495; 524/496; 524/497; 528/490
[58] Field of Search ............................. 524/409, 432, 524/495, 496, 497, 437; 528/490

[56] References Cited

U.S. PATENT DOCUMENTS

| | | | |
|---|---|---|---|
| 2,719,135 | 12/1952 | Wood | 260/33.6 |
| 4,369,267 | 1/1983 | Keung et al. | 523/351 |
| 5,304,588 | 4/1994 | Boysen et al. | 523/204 |

OTHER PUBLICATIONS

S. S. Voyutsky et al., "Causes of the Granulation of Powders" Colloid J. (USSR), 29–36 (1952). E. C. Nov. 8, 1996.
S. S. Voyutsky et al., "Pellitization of Powders By The Rolling Method" Light Industry (USSR), 12, 36 (1952).

T. K. Ross et al., "The Granulation of Carbon Black" Trans. Instn. Chem. Engrs., 39, 28 (1961).

H. P. Meissner et al., "Rate of Pellitization of Zinc Oxide Powders" Ind. Eng. Chem. Process Design and Development, 5, 10 (1966).

H. P. Meissner et al., "Spontaneous Pellitization In Fine Powders" Ind. Eng. Chem. Process Design and Development, 3, 197 (1964).

L. H. Ford et al., "The Mechanism of Binderless Granulation and Growth of Ceramic Spheres" J. Nuclear Materials, 43, 143 (1972).

Voyutsky et al., "Causes of the Granulation of Powders" Colloid J. (USSR) 14, 28 (1952).

*Primary Examiner*—Edward J. Cain

[57] ABSTRACT

This disclosure relates to a process for preparing co-pelletized submicron pigment powder/polymer pellets in a dry drum pelletizing process using a thermoplastic polymer as seed pellets. Also disclosed is a process for using the co-pelletized product either for formation of masterbatch or for directly introducing at least one pigment into thermoplastic media.

21 Claims, No Drawings

PREPARATION AND USE OF PELLETIZED SUBMICRON PIGMENT POWDER/POLYMER COMPOSITIONS

FIELD OF ART

The present invention concerns the formation of free-flowing dispersible pigment/polymer pellet compositions in dry drum pelletizers. The products are useful for making highly loaded masterbatches or for introducing pigments into polymeric media.

BACKGROUND OF THE ART

As produced, carbon blacks are powdery materials with bulk densities ranging from about 0.02 to 0.1 g/cc and are termed fluffy blacks. Because of their low densities and large surface areas, the fluffy products are cohesive, have very poor conveying properties and are quite dusty. They are, however, dispersible. Because of their poor bulk handling properties, advantage of their excellent dispersibilities cannot be taken in many applications. For example, it is difficult to feed fluffy blacks in a controlled manner to standard dispersing devices, such as Banbury mixers, twin screw extruders or the like.

To improve their handling properties, the fluffy products are densified. For a given grade of black, handling properties tend to improve with increasing degrees of densification. Dispersibility, on the other hand, is progressively degraded as the extent of densification is increased. Thus there is a tradeoff between improvement in bulk handling and degradation in dispersibility. For this reason, the extent and means employed to densify the fluffy products depend on their intended uses.

The industry, in general, uses three basic methods to attain densification. These, in order of providing increased levels of densification, are: agitation or vacuum treatment of the fluffy product, dry pelletization and wet pelletization. Since the performance of carbon black in many applications depends on the degree of dispersion attained, the acceptable extent of densification achieved depends on the user's dispersion equipment and, especially, on the shearing stresses generated.

The process of agitation or vacuum treatment yields a powder which is difficult to bulk handle and is commercially supplied in a bagged form. Nevertheless, because this form of the product is much more dispersible than its more dense counterparts, it is used in applications where easy dispersion is mandatory.

Dry pelletization gives pellets which are relatively weak and have poor attrition resistances. As a consequence, conveying can cause pellet breakdown which leads to a degradation in their bulk handling properties.

Wet process pellets are formed in pin pelletizers using water as a cohesive fluid. The resultant pellets, after drying, are relatively dense, hard and attrition resistant. Such products have relatively good bulk handling properties but are more difficult to disperse than their dry process counterparts.

Dry pelletization is conducted in rotating drums. Industrial drums have diameters of 1.83 to 3.04 m (6 to 10 feet) and lengths of 6.1 to 12.2 m (20 to 40 feet) and are rotated at 5 to 20 RPM (revolutions per minute). Fluffy black together with seed pellets are fed continuously to one end of the drum. Tumbling of the fluffy black/seed pellet mixture in the rotating drum results in the formation of product pellets which exit the other end of the drum. The seed pellets employed commercially consist of part of the product pellets which are recycled to the feed end of the drum.

Pellet formation in the dry drum process is greatly facilitated by the use of seed pellets. Generally, the fluffy black to seed pellet weight ratio is in the region of 1:1 but can vary from 0.2:1 up to 5:1. The seed pellets serve as the nuclei for pellet formation and growth. The quality of the seed pellets, in terms of density, size and size distribution, and the amount employed has a profound effect on product quality. Since part of the product pellets are employed as seed pellets, the qualities of the seed and product pellets are coupled. Hence, formation of poor quality pellets leads to formation of poor quality seed pellets which, in turn, results in a further reduction in product quality. Thus there is a strong feedback loop between seed and product quality, the decoupling of which would be highly advantageous. This decoupling can be achieved by using an alternate source of seed pellets so that the extent of product recycle can be either reduced or, more preferably, eliminated.

Voyutsky et al. claimed that the seed material used in the dry drum pelletizing of carbon black could consist of either densified carbon black of small diameter or "any small foreign bodies such as plant seeds, sugar crystals, etc." Voyutsky et al. and Voyutsky and Rubina showed that the black was deposited onto the seed material. These disclosures are found in Voyutsky, S. S., A. D. Zaronchkovsky and S. I. Rubina, "Causes of the Granulation of Powders," Colloid J. (USSR), 14, 28 (1952) and in Voyutsky, S. S. and S. I. Rubina, "Pelletization of Powders by the Rolling Method, Light Industry (USSR), 12, 36 (1952). These workers varied the sizes of their seed pellets from about 0.8 to more than 2.5 mm and found, when using a 1:1 black to seed ratio, that the fractional increase in the diameters of the resultant pellets increased with seed diameter. However, as seed diameter increased, the size distribution of the resultant pellets showed a progressively increasing degree of tailing at the fine end of the distribution. This tailing was attributed to crushing of the carbon shells of some of the larger pellets. These workers also claimed that pellet formation, in the presence of seed, was more rapid and yielded larger pellets at elevated pelletizing temperatures. Temperatures from 20° up to 95° C. were investigated.

Ross and Davies studied the dry drum pelletization of a furnace black in a 0.094 m (3.72-inch) diameter drum. This disclosure is found in Ross, T. K. and T. Davies, "The Granulation of Carbon Black," Trans. Instn. Chem. Engrs., 39, 28 (1961). They used 2.7 mm glass spheres as seed and found that the seed became coated with a relatively dense layer of carbon black.

In their studies of the dry pelletization of zinc oxide, Meissner H. P., A. S. Michaels and R. Kaiser in "Rate Of Pelletization Of Zinc Oxide Powders," Ind. Eng. Chem. Process Design and Development, 5, 10, (1966) and in "Spontaneous Pelletization In Fine Powders," Ind. Eng. Chem Process Design and Development, 3, 197 (1964), claimed that an uncompacted mass of any powder having particles less than one micron in size can be converted into closely sized, dense, free-flowing pellets by tumbling in a drum. They suggested that the attractive forces holding the particles together in an agglomerate or a pellet were van der Waals attractive forces. When the powder particles are much larger than 1 micron, their inertial forces are large compared to the van der Waals attractive forces and, hence, they exhibit little tendency to form agglomerates or pellets. As the particles become smaller, however, the ratio of attractive forces to inertial forces increases rapidly. As a consequence, the finer particles cling to each other at their points of contact to form agglomerates or pellets whose strength increases as the particle size decreases.

Meissner et al. stated that prior studies had also suggested that any dry powder will pelletize by mechanical agitation, such as that occurring by tumbling in a drum, if the prime particles are small enough. Moreover, the dry pelletization process is greatly facilitated by the presence of a sizable volume fraction of seed pellets. Any solid objects, nominally greater than 200-mesh (74 microns) in size, such as glass spheres, sugar crystals, metal shot, vegetable seeds, or recycled agglomerates of the powder itself, may serve as seed pellets. These grow at the expense of powder and prolonged tumbling ultimately causes all the loose powder to disappear. In other words, the seed pellets become coated with the submicron powder. Ford, L. H. and J. V. Shennan in "The Mechanism Of Binderless Granulation And Growth Of Ceramic Spheres," J. Nuclear Materials, 43, 143 (1972), showed that mixtures of submicron uranium oxide and carbon, having surface areas of 2 to 4 $m^2/g$ and 17 to 30 $m^2/g$, respectively, can be dry pelletized. These workers used preformed pellets as seed pellets which grew at the expense of the unagglomerated powder.

Accordingly, the prior art has demonstrated that powders with sizes smaller than about one micron can be dry pelletized and that the pelletization process is greatly facilitated by the use of seed pellets. The seed pellets can consist of either the same material being pelletized or of a foreign material. With either class of seed pellets, the product pellets consist, predominantly of a seed core covered by a layer of the submicron powder.

Although the prior art has demonstrated that submicron powders can be dry pelletized, only carbon black appears to be pelletized on a large commercial scale by a dry tumbling process. Moreover, even with carbon black, use of foreign materials as seed pellets does not appear to be practiced on a commercial scale probably because they cannot be separated in an economically feasible manner from the carbon black in the product pellets. Further, incorporation of the foreign materials suggested as potential seed pellets, such as plant seeds, sugar crystals, metal shot and glass spheres, with the carbon black (or other submicron materials) in end use applications as, for example, in news inks, tire products and polymeric media would be detrimental to their performance properties.

Boysen et al. used a fluid bed process to form core-shell resin particles composed of a core containing a majority (more than 90% by weight) of rubber or resin and a shell containing a majority (more than 75% by weight) of particulate matter such as carbon black, silica, clay and other like materials. Further exemplification of this technology appears in Boysen, R. L., L. S. Scarola, and A. S. Rhee, "Core-Shell Resin Particle," U.S. Pat. No. 5,304,588 (1994). The rubber or resin core consisted of materials such as very low density polyethylene, ethylene/propylene diene monomer (EPDM), ethylene/propylene monomer (EPM) and polypropylene copolymers.

Wood introduced a countercurrent flow of rubber crumb in a stream of carbon black effluent gases containing carbon black to be recovered. This technology is further exemplified in Wood, J. Q., "Recovery Of Carbon Black," U.S. Pat. No. 2,719,135 (1955). Wood claimed that most of the carbon was removed from the gas stream by adhering to the surface of the rubber crumb. Moreover, the amount of carbon black adhering to the crumb could be controlled by recycling the crumb until it had acquired the coating desired. Thus the product formed by Wood can be characterized as consisting of a rubber core and a carbon shell. Further, the crumb-carbon black product could be used in a rubber compounding operation.

Pigments used to color thermoplastic polymeric media and/or provide flame retardancy frequently have submicron particle sizes. These include white pigments, such as titanium dioxide, zinc oxide, antimony oxide and hydrated aluminum oxide, black pigments, such as carbon blacks as well as colored organic and inorganic pigments, such as phthalocyanines, quinacradones, red iron oxides, cadmium sulfoselenides and chrome oxides or a suitable mixture thereof. In practice, the same equipment is often used to produce differently colored thermoplastic polymeric articles. In such applications, the pigments must be dispersed well so as to attain their full coloring values and to avoid degrading polymer properties. All of the aforementioned groups of submicron pigments are suitable for use in the present invention.

To avoid cross-contamination when using the same equipment with different powdered or pelletized pigments, extensive cleaning of the equipment is mandatory. Cleaning becomes particularly time consuming and costly when pigments which are prone to dustiness, such as carbon black, are used. To overcome the need for extensive cleaning, to ensure attainment of good quality dispersions, to attain accurate metering and to eliminate the possibility of dust formation, concentrated dispersions, termed masterbatches or concentrates, of the various pigments or pigment mixtures in the thermoplastic media are often used in place of either the powder or pelletized forms of the pigments.

The production of masterbatches using thermoplastic polymers, such as polyethylene, polypropylene, acrylonitrile-butadiene-styrene copolymer, ethylene vinyl acetate, etc., is of special importance. In this application, pellets of the thermoplastic polymer and pigment or pigments, either in powder form, such as in the case of titanium oxide, or pelletized form, such as in the case of carbon black, are fed to high shear mixers such as Banbury mixers, twin screw extruders or the like. As a result of the combination of heating and mechanical work, the polymer is transformed to a viscous molten state in which the pigment or pigments is dispersed. For production of acceptable masterbatches, the formation of good quality dispersions is of critical importance. After the dispersion process is complete, the masterbatch is, for example, extruded, cooled and then sliced into pellets for shipment.

Thermoplastic polymers manufactured by the "slurry process" are produced in a powder form, called "reactor crumb". Because of potential feeding problems, reactor crumb is not used as the preferred feed to shear mixers. Instead, prior to use in masterbatch formation, the crumb is, typically, converted to 3 mm cylindrical pellets (by means of a single or a twin screw extruder followed by slicing). Similarly, because of potential feeding problems and because of its low bulk density and in spite of its superior dispersibility, fluffy black is not normally employed in masterbatch production. Instead, spherically shaped carbon black pellets, formed either in pin or dry drum pelletizers, with mean sizes in the range of 0.2 to 2.0 mm are employed as feed. Thus the feeds employed in masterbatch formation consist of carbon black and polymer pellets having differing mean sizes. This disparity in size is even more pronounced with powdered pigments.

The disparity in the sizes (and shapes) of the thermoplastic polymer and pigment or pigments enhances segregation processes and, for this reason, formation of a uniform blend of the polymer and pigment feeds becomes difficult. Thus, for formation of good quality masterbatches both dispersive and distributive mixing are required.

Reactor crumb has both a size (mean sizes in the range of 0.2 to 2.0 mm) and a density of about 0.9 g/cc which makes it ideal for consideration as a seed material in the dry drum pelletization of submicron pigment powders. Further, the resultant co-pelletized pigment/polymer compositions, in the form of core and shell products, represent intimate mixtures of the polymer and pigment or pigments. In addition, the composition of the seed can be chosen so that it is identical with that used in making the masterbatch. Thus, with the appropriate choice of polymeric seed material, the co-pelletized pigment/polymer products are highly suited for directly feeding to mixers for forming pigment loaded masterbatches containing white pigments, such as titanium dioxide, zinc oxide, antimony oxide and hydrated aluminum oxide, black pigments, such as carbon blacks as well as colored organic and inorganic pigments, such as phthalocyanines, quinacradones, red iron oxides, cadmium sulfoselenides and chrome oxides or a suitable mixture thereof. When mixtures of pigments are utilized, any proportion of the submicron pigment powders may be used to form the co-pelletized mixed pigment/polymer product.

For economic reasons, high loadings of pigment in a concentrate are preferred. However, for rapid incorporation during let-down, the viscosity of the concentrate should not be very different from that of the medium in which it is being dispersed. Concentrate viscosity increases with pigment loading and approaches a high value as its solids content approaches that required for the pigment to attain its maximum packing fraction, defined as the true volume of the pigment divided by the apparent volume occupied by the pigment. Further details of the effects of loading on viscosity may be found in, for example, Nielsen, L. E., "Polymer Rheology," Marcell Dekker, Inc., New York, 1977. Accordingly, to obtain acceptable viscosities, the pigment loading in a masterbatch will be less than that at which it attains its maximum packing fraction.

A variety of methods are available for estimating the maximum packing fraction of pigments. A particularly convenient method is that based on the determination of their oil absorption values. Details for determining oil absorption values and procedures for estimating packing fractions from them are given in Patton, T. C., "Paint Flow And Pigment Dispersion," John Wiley & Sons, Inc., Second Ed. (1979). Since most pigmentary powders are composed of reasonably spherical unaggregated particles, they have relatively small oil absorption values, ranging from about 17 to about 50 cc oil per 100 g pigment and, hence, have maximum packing fractions which, typically, exceed 0.5. Masterbatches having pigment loadings well in excess of 50 weight % can be formed from such pigments without increasing their viscosities by more than a factor of 2 to 3 when compared to the unloaded polymer.

Carbon blacks, unlike most pigmentary particles, are composed of aggregates which, depending on the grade of black, can contain a large number of fused primary particles. The maximum packing fraction of carbon black can be estimated from its di-n-butyl phthalate, DBP, absorption which can be determined by the ASTM D 2414 procedure. The DBP and oil absorption tests provide similar information.

Experience has shown that carbon black pellet dispersibility decreases as black surface area increases and/or its DBP decreases. Because of difficulties encountered in their dispersion (and depending on the application), blacks with low DBP values and very high surface areas are rarely used to form masterbatches. For example, for applications where jetness or UV protection are needed, the black should have a high surface area. To form acceptable concentrates with a black having a high surface area, a high DBP product may often be used in concentrate formation. Thus, practical considerations dictate that in masterbatch formation a compromise be struck between black loading and dispersion quality. For this reason, blacks with the lowest attainable DBP values are rarely used in the production of black masterbatches.

In spite of their costs, the market for pigment concentrates or masterbatches is substantial because the resulting products are dust-free, easily conveyed, accurately metered and much more easily dispersed in compatible thermoplastic media than either pigment powders or conventionally pelletized blacks. We have found that the dry process pellets of the present invention, formed using reactor crumb as seed pellets, represent a very desirable raw material source to be used for the production of pigment loaded masterbatches. Further, in applications where the conveying and metering equipment can handle pellets with a wider size distribution than that of conventional masterbatch pellets, the products of the present invention can be used in place of masterbatch for introducing the desired submicron pigment or pigments into polymeric media without substantial loss in dispersion quality.

SUMMARY OF THE INVENTION

The present invention concerns a process for forming a co-pelletized pigment/polymer composition. The resultant pigment/polymer pellets can be used in place of masterbatch for introducing submicron pigments such as white pigments, such as titanium dioxide, zinc oxide, antimony oxide and hydrated aluminum oxide, black pigments, such as carbon blacks as well as colored organic and inorganic pigments, such as phthalocyanines, quinacradones, red iron oxides, cadmium sulfoselenides and chrome oxides or a suitable mixture thereof into polymeric media. When mixtures of pigments are utilized, any proportion of the submicron pigment powders may be used to form the co-pelletized mixed pigment/polymer product. Alternately, upon further processing of the co-pelletized polymer/pigment composition, with and without further additives, the product can be used to produce a pigment loaded masterbatch. The process consists of dry drum pelletizing at least one submicron pigment powder together with thermoplastic seed pellets. The pelletizing operation can be effected either at ambient temperatures or, more preferably, at temperatures above the melting or softening temperature of the polymeric seed material. In the latter case, the temperature and residence time of the pigment/polymer pellets in the pelletizer are controlled so as to minimize the extent of polymer degradation.

The co-pelletized pigment/polymer product, formed in the dry drum process, may then be fed to a conventional high shear mixer, with or without further additives, to form a masterbatch which, optionally, may then be extruded, and sliced into conveniently sized pellets. Alternately, the co-pelletized product can be used directly to introduce the pigment or pigments into polymeric media.

DETAILED DESCRIPTION OF THE INVENTION

The present invention concerns a process for forming a co-pelletized pigment/polymer composition. The resultant pigment/polymer pellets can be used either to prepare a pigment loaded masterbatch or to introduce a pigment or pigments into polymeric media. In the process, at least one submicron pigment powder is contacted with thermoplastic polymeric seed pellets in a conventional rotating dry drum. The thermoplastic polymeric seed pellets have a mean size in the range of about 0.2 up to 2.0 mm and soften or melt when heated. Such thermoplastic polymeric seed pellets may be obtained by the following routes:

1) Suspension polymerization also known as the slurry process which, upon separation of the liquid, yields a powdery material termed reactor crumb. Examples of such materials include homo- and copolymers of polypropylene, homo- and copolymers of polyethylene, EPR (ethylene-propylene copolymer) and EPDM (ethylene-propylene terpolymer) rubbers and styrene butadiene block polymers. Also included in this category are condensation polymers produced using the non-aqueous dispersion polymerization process, e.g., polyamide 6,6, polyamide 6,10 and polyethylene terephthalate.

2) Emulsion polymerized products which are converted to powder form by spray drying, freeze drying, freeze coagulation or chemical coagulation. Examples of products formed by emulsion polymerization include vinyl acetate/ethylene co- and terpolymers, styrene/acrylate copolymers and acrylonitrile butadiene latexes.

3) Thermoplastic polymers which have been derived from any process which has undergone a mechanical size reduction. Examples include rosin and rosin esters and hydrocarbon resins produced either by thermal polymerization or by Friedel Crafts polymerization of dicyclopentadiene, cumene, indene, styrene, etc. Additional examples include solution polymerized elastomers such as block copolymers of styrene and butadiene, polyisoprene and polybutadiene which are normally available in compacted bales or as large particles (greater than 2 mm).

During the dry drum pelletization process, the thermoplastic polymeric seed pellets become coated by a layer of pigment or pigment mixture. Thus the product pellets consist, predominantly, of a polymer core and a shell of submicron pigment powder. They are not as subject to segregation as a physical blend of polymer and either pigment powders or carbon black pellets having a different mean pellet size. Moreover, the co-pelletized product is free-flowing and can be metered and fed directly to a mixer such as a Banbury mixer, twin screw extruder or the like.

The temperature at which the pelletizing operation is conducted has a profound effect on the strengths of the resulting pellets. Pelletizing at temperatures up to the softening or melting point of the seed material gives soft, dispersible but low strength shells of pigment. As a consequence, the measured pellet strength is small. Surprisingly, and in spite of the relatively high viscosities of the polymer melts, pelletizing at temperatures above the softening or melting point of the polymeric seed pellets results in substantially increased pellet strengths. The movement of the pellet bed in the drum also facilitates strength enhancement. Further, as the pelletizing temperature is increased there is a progressive increase in pellet strength. The maximum temperature at which pelletization can be effected is dependent on the temperature at which the polymer exhibits significant degradation. Since the mean residence time of the carbon black/polymer composition in a conventional dry drum pelletizing process is of the order of 0.5 to 2 hours and since more than 5% polymer degradation is considered to be excessive, the maximum pelletizing temperature that can be employed is that at which the rate of polymer degradation is, most preferably, less than about 2.5 to 5% per hour. One method for obtaining a quantitative measure of degradation of thermoplastic polymers is by determining the oxidative induction time as described, for example, in British Standards 2782, Part I.

The seed pellets used in the dry drum pelletization process can consist of either the thermoplastic polymeric seed material or a combination of the thermoplastic polymeric seed material and a fraction of the product pellets recycled to the feed end of the drum. Thus, the amount of polymer employed and the ratio of submicron pigment to seed pellets can be independently varied and maintained within the desired range of 0.2:1 to 5:1.

The pigment to polymeric seed pellet weight ratio employed during pelletization will depend on the pigment loading required in the pelletized product and will be in the range of 0.4:1 to 9:1. In general, the preferred ratio will be set by the oil absorption of the pigment and the intended product usage. For masterbatch production and when the pigment chosen is carbon black, the ratio preferably will be in the range of 0.4:1 to about 2:1. When the pigment has a small oil absorption value, as, for example, titanium dioxide with an oil absorption of about 20 parts oil per 100 parts pigment, the ratio preferably will be in the range of 1:1 to about 9:1.

When the pellets of the present invention are used directly in letdown applications, in place of masterbatch, the pigment to polymer seed ratio will be in the range of 0.8:1 up to 9:1 and, more preferably, in the range of 0.8:1 to 3:1. These ranges represent a compromise between the requirements of significant strength enhancement when pelletizing at temperatures above the softening or melting temperature of the polymeric seed material and, depending on the application medium, of medium contamination with the seed material. Preferably, the compositions of the thermoplastic seed pellets and the application medium are the same.

The dispersibility of the pigment in the co-pelletized product can be manipulated by varying the pelletizing conditions employed. For example, factors such as residence time in the pelletizer, drum RPM, bed depth in the dry drum, amount of recycle employed and pelletizing temperature are all known to affect the density of dry pelletized carbon black. Since dispersibility is degraded as pigment pellet density is increased, pelletizing conditions can be chosen so that the most favorable tradeoff between bulk handling properties and dispersibility is attained.

EXPERIMENTAL

Materials

Utilized herein were the following:

a) CHEMIGUM® P7-D and CHEMIGUM® P8-D nitrile rubbers which were produced by Goodyear Chemicals. They were produced by an emulsion polymerization process, subsequently coagulated and then mechanically size reduced. b) Linear low density polyethylene, LLDPE, GRSN 7510, produced by Union Carbide Chemicals and Plastics Co., Polyolefins Division. The products is a reactor crumb and has a melt flow index, MFI, of 0.7.

c) FORTIFLEX® high density polyethylene, HDPE, HDPE G38-70C, produced by Solvay Polymers. The product is a reactor crumb and has an MFI of about 1.

d) Titanium dioxide, R101, produced by du Pont and having a mean size of about 0.2 micrometers (µm)

e) Zinc Oxide, KADOX® 911, produced by Zinc Corp. of America and having a mean size of 0.12 μm.

f) Calcium carbonate powder supplied by Aldrich Chemical Co. and having a mean size of about 10 μm.

Laboratory Scale Dry Drum Pelletization

Batch dry drum pelletization was effected at a laboratory scale in a 0.394 m (15.5-inch) diameter by 0.61 m (24-inch) long drum fitted with a scraper bar. The drum was rotated at 20 to 35 RPM. The requisite amount of polymer seed pellets was placed in the drum and then a known weight of the fluffy black, powdered pigment or mixture of fluffy black and powdered pigment was slowly added to the seed pellets in the rotating drum.

Continuous Dry Drum Pelletization

Dry drum pelletization was conducted continuously at a pilot scale using a 2.13 m (7-foot) diameter by 6.1 m (20-foot) long drum rotated at 12 RPM. HDPE reactor crumb was fed to one end of the dry drum at nominal rates of either 88 g/s (700 lb/hr) or 132 g/s (1050 lb/hr). Fluffy black was added to the same end of the drum at a fixed rate of about 82 g/s (650 lb/hr). Bed depth in the drum was maintained at either 0.20 m (8 inches) or 0.46 m (18 inches) and pelletizing was conducted at ambient temperatures.

Effects of Temperature

The effects of pelletizing at elevated temperatures were simulated by placing the pelletized product formed at ambient temperatures in either a 0.56 m (22-inch) diameter by 0.56 m (22-inch) long or a 0.30 m (12-inch) diameter by 0.41 m (16-inch) long drum rotated usually at about 6 RPM and indirectly heated to a specified temperature.

Pelletizing was also effected in the smaller drum at elevated temperatures. In these experiments the drum was rolled at 20 RPM.

Product Evaluation

Pellet strength properties were evaluated by means of mass pellet strength (ASTM D 1937) and pellet attrition (using a modified version of ASTM D 4324) tests. The latter procedure was modified so that the total dust generated was found and expressed as a percentage of the total amount of material screened after shaking the samples for 5 and 15 minutes. The ASTM procedure calls for reporting the percent of the sample transformed to dust between 5 and 20 minutes. Carbon black iodine adsorption numbers, $I_2$ No., and DBP values were determined using the ASTM D 1510 and ASTM D 2414 procedures, respectively. Surface area was determined using the ASTM D 3765 procedure. Tap densities were determined by placing a known weight of pellets, screened to a narrow size distribution, in a graduated cylinder and then tapping the sample to a constant volume. Pellet size distributions were determined by manual screening procedures. To calculate mean pellet size, the cumulative size distribution results were fitted to a normal distribution from which the mean size and the width of the distribution, σ, were calculated. In addition, the dust contents of the samples, defined as material passing through a 120 mesh (125 micron) screen, were determined using a manual screening procedure.

The dispersibility of the products were evaluated using either the Cabot Dispersion Classification chart, described in "Carbon Black Dispersion," Cabot Corporation Technical Report S-131 (1989) or the AFNOR procedure, described in l'Association Francais de Normalisation (AFNOR)," Plastic Materials, Compounds Based On Polyethylene And Polyethylene Copolymers, Evaluation Of The Degree Of Dispersion Of Carbon Black—Test Method," French Standard NF T 51-142, Feb. (1992). In the former method a letdown is viewed at a 100 fold magnification and the sizes and numbers of undispersed units are visually compared against those in a standard chart. The sizes of the undispersed units rise with increase in the value of the number rating (from 1 to 6) and their numbers increase progressively from A to F. A similar procedure is used in the AFNOR test but a single number is used to characterize dispersion quality, with the lower number ratings indicating better dispersion quality.

Further experimental details as well as the dispersion procedures used are given in the Examples.

EXAMPLES

The size characteristics of the "as received" polymeric seed materials which were used in most of the laboratory scale studies are presented in Table 1. The results show that in all cases the products had mean sizes in the range of 0.5 to 1.0 mm and dust contents which were less than 10%.

TABLE 1

| Characteristics of Seed Pellets | | | |
|---|---|---|---|
| Polymer Type | Mean Size, mm | σ | Dust, % |
| LLDPE | 0.99 | 0.37 | 0.3 |
| HDPE | 0.71 | 0.33 | 3.8 |
| *Chemigum P7-D | 0.66 | 0.41 | 1.1 |
| *Chemigum P8-D | 0.50 | 0.24 | 5.3 |

*Trademarked nitrile rubbers produced by Goodyear Chemicals

EXAMPLES 1–4

Laboratory Scale Studies With Carbon Black

The effectiveness of the four polymer products characterized in Table 1 as seed pellets was studied in the laboratory dry drum. For each material, 400 g was placed in the dry drum and rolled at about 25 RPM. Thereafter, 400 g of a fluffy black, having a DBP of 74 cc/100 g and a surface area of 210 m²/g, was added in increments to the seed pellets over 30 minutes. The products were rolled, at ambient temperatures, for either an additional 30 minutes (Examples 1, 3 and 4) or an additional 60 minutes (Example 2). The resulting pellet sizes and sample dust contents are presented in Table 2.

TABLE 2

| Pellet Size Characteristics | | | | |
|---|---|---|---|---|
| Example No. | Seed Type | Mean Size mm | σ | Dust % |
| 1 | LLDPE | 1.14 | 0.51 | 2.0 |
| 2 | HDPE | 0.71 | 0.43 | 5.9 |
| 3 | ªP7-D | 0.67 | 0.33 | 3.6 |
| 4 | ªP8-D | 0.82 | 0.45 | 5.0 |

ªCHEMIGUM ® nitrile rubber

The small dust contents present, less than 6%, in the samples characterized in Table 2 show that most of the fluffy carbon black was transformed into pellets. In other words, the black was deposited onto the surfaces of the polymeric seed pellets. Moreover, an examination of 20 random pellets of the product of Example 1 showed that each pellet consisted of a polymer core surrounded by a shell of carbon black. However, since the mean pellet sizes of the products of Examples 1, 2 and 3, Table 2, are not very different from the mean sizes of their respective seed pellets (shown in Table 1), not all the carbon black adhered to the polymer surface. As suggested by Voyutsky et al., it is likely that some shedding off of the carbon shell from the polymer surface took place. In other words, new, polymer-free seed pellets were formed. Their formation and growth, in general, serve to broaden the distribution resulting in increased $\sigma$ values. Compare appropriate seed and product $\sigma$ values in Tables 1 and 2 where an increase in this value is shown in three out of the four examples.

The dispersion quality attained using the product of Example 1 was compared against that attained using a mixture of conventionally dried pin pelletized (wet process) carbon black pellets and LLDPE pellets. Masterbatches containing 35 weight % carbon black loadings were formed using both the product of Example 1 and the conventional physical mixture of polymer and carbon black pellets. These were formed in a laboratory Brabender mixer under identical loading, mixing and time-temperature conditions (70% volume fill, 25 RPM, 7 minutes mixing time, 160° C. chamber temperature followed by an additional 3 minutes of mixing at 50 RPM). A small amount of LLDPE pellets was added to the product of Example 1 so as to attain a 35% carbon black loading in the resulting masterbatch. Both masterbatches were then let down (i.e., diluted) in LLDPE on the two roll mill to a 1.0% black loading under identical mixing conditions. The dispersion quality attained with the dry drum co-pelletized carbon black/polymer product of Example 1, as measured by the Cabot chart method, had a 3D rating. That resulting from the conventionally pin pelletized product was given a 5C rating. This demonstrates the superior dispersibility of the co-pelletized carbon black/polymer product of Example 1 compared to that of conventional carbon black pellets.

EXAMPLES 5–8

Carbon Black:Polymer Seed Ratio—Laboratory Scale Studies

The effect of varying carbon black to polymer seed pellet ratio on pellet size was investigated using LLDPE reactor crumb. Apart from the weights of seed and black employed and the total pelletizing time employed, the experimental procedure adopted was similar to that used in Examples 1–4. The weight of seed and the total pelletizing time employed together with their effects on pellet size characteristics are summarized in Table 3.

TABLE 3

| Example No. | Black Weight g | Seed Weight g | Black To Seed | Rolling Time Hours | Mean Size mm | $\sigma$ | Dust % |
|---|---|---|---|---|---|---|---|
| 5 | 100 | 400 | 1:4 | 1 | 0.94 | 0.41 | 0.5 |
| 6 | 267 | 400 | 2:3 | 1 | 0.92 | 0.47 | 3.9 |
| 7 | 400 | 400 | 1:1 | 3.5 | 1.14 | 0.51 | 2.0 |
| 8 | 500 | 100 | 5:1 | 3.5 | 0.81 | 0.47 | 2.8 |

The results in the table demonstrate that pellet formation occurred within reasonable rolling times at all black to seed ratios (up to 5:1) investigated. Further, the products contained relatively small amounts (less than 4%) of dust. Thus the present studies show that pelletization can be effected with much smaller amounts of seed pellets than typically used when product pellets are recycled to the drum. By using a combination of polymer and recycled product as seed pellets, pelletized products with carbon black to polymer ratios of 9:1 can be produced.

At the 5:1 carbon black to seed pellet ratio and as shown by the product of Example 8, the mean pellet size of the co-pelletized product is smaller than the mean seed pellet size. This reduction in mean size shows that not all the carbon black adhered to the polymer seed pellets. As already noted, this can be attributed to some shedding off of sections of the carbon shell from the polymer surface. Such sections also act as new seed material. The frequency of shedding is expected to increase with shell thickness.

EXAMPLES 9–13

Seed Size—Laboratory Scale Studies With Carbon Black

The LLDPE reactor crumb product was screened to form a series of seed pellets with differing mean sizes. The effect of seed size was investigated by pelletizing a fluffy black with a DBP of 74 cc/100 g black and a surface area of 210 $m^2$/g with the screened LLDPE seed pellets. In all cases the carbon black to polymer weight ratio was maintained at 1:1. The pelletizing procedure used was similar to that employed in Examples 1 to 4. The mean seed sizes, their size ranges and the mean sizes of the resulting pellets are presented in Table 4. The results demonstrate that as seed pellet size is increased the magnitude of the difference in the mean pellet and seed size increases, attains a maximum value at 1 mm seed size and then declines. This demonstrates that for the present experimental conditions substantial shedding occurs when the seed pellet size is greater than 1 mm. In practice and depending on the pelletizing conditions employed as well as the black grade being pelletized, the extent of shedding will be small when the mean seed sizes are smaller than 1.5 to 2.0 mm.

TABLE 4

Effect of Seed Size on Resultant Pellet Size

| Example | Screen Size, mm | [a]Mean Seed | Mean Product |
|---|---|---|---|
| 9 | <0.5 | 0.28 | 0.46 |
| 10 | 0.125–0.5 | 0.30 | 0.45 |
| 11 | 0.5–1.0 | 0.65 | 0.90 |
| 12 | 1.0–1.4 | 1.02 | 1.28 |
| 13 | 1.4–2.0 | 1.45 | 1.43 |

[a]Estimated by further screening within the specified size ranges

The present results suggest that the carbon black shell in the core/shell co-pelletized products are less easily degraded when the seeds have smaller mean sizes. This is attributed to reduced shell thickness as polymer seed size decreases. For a given carbon black to polymeric seed weight ratio, shell thickness decreases with decreasing seed size.

EXAMPLES 15–20

Pilot Scale Studies With Carbon Black

The feasibility of forming a co-pelletized product at a pilot scale suitable for either masterbatch formation or for direct letdown was investigated using HDPE as the thermoplastic polymeric seed pellets. Two fluffy blacks, having DBP values of 111 and 78 cc/100 g carbon and both having an $I_2$ No. of about 130 mg/g were either pin pelletized using water and then dried (identified as WP in Table 5 and serve as control runs for forming conventional pelletized products) or dry drum pelletized (identified as DP in Table 5). An HDPE reactor crumb with a mean particle size of 0.61 mm, a σ of 0.33 and a dust content of 6.1 weight % was used as seed pellets in the latter process. Dry drum pelletizing runs were conducted at bed depths of 0.20 or 0.46 m (8 or 18 inches). In all cases the dry drum pelletizing operation was trouble-free and the products exiting the dry drum appeared to be reasonably dust-free. With conveying and packing, however, some dust formation became apparent.

The bagged products were characterized with respect to their mean pellet sizes, dust contents, tap densities, mass pellet strengths and attrition resistances as determined by their 5 and 15 minute percentage dust contents. The results obtained are summarized in Table 5.

TABLE 5

Properties of Wet And Dry Drum Pelletized Blacks

| Example No. | Black DBP cc/100 g | ªPellet Process | Dam Height m | % HDPE Content | Mean Size, mm | Dust % | MPS kg | 5 Min. Dust, % | 15 Min. Dust, % | Tap Density g/cc |
|---|---|---|---|---|---|---|---|---|---|---|
| 14 | 111 | WP | NA | 0.0 | 0.73 | 5.7 | 3.6 | 10.8 | 16.8 | 0.385 |
| 15 | 111 | DP | 0.20 | 55.8 | 0.73 | 4.0 | 4.1 | 18.7 | 28.5 | 0.406 |
| 16 | 111 | DP | 0.20 | 57.1 | 0.54 | 7.6 | 2.7 | 19.1 | 25.1 | 0.399 |
| 17 | 111 | DP | 0.46 | 49.3 | 0.46 | 8.6 | 2.7 | 15.8 | 21.7 | 0.398 |
| 18 | 78 | WP | NA | 0.0 | 0.57 | 5.0 | 4.1 | 6.4 | 8.2 | 0.512 |
| 19 | 78 | DP | 0.20 | 54.4 | 0.75 | 5.9 | 3.2 | 20.3 | 26.5 | 0.417 |
| 20 | 78 | DP | 0.20 | 66.5 | 0.70 | 9.0 | 2.7 | 16.1 | 17.3 | 0.428 |

WP = Wet Process; DP = Dry Process, NA = Not Applicable pellet strengths. Also, all the samples contain high dust levels. Nevertheless, and as expected, the attrition resistances of the wet process pellets are superior to those of the dry drum pelletized products, as shown by their smaller 5 and 15 minute dust values.

The utility of the products in Table 5 for forming masterbatches in a Banbury mixer under identical mixing conditions was investigated. The control products, formed by conventional pin pelletizing (Examples 14 and 18), were dispersed in HDPE, having a similar MFI to that of the seed, at 40 and 50 weight % black loadings. The dry drum pelletized products were simply processed into masterbatches in the same Banbury mixer. In these cases, therefore, the carbon black loadings were identical to the carbon black contents of the co-pelletized products. The resulting masterbatches were let down in polyethylene using a single screw extruder to a 2.5 weight % black loading and then dispersion quality was assessed using the AFNOR procedure. The results obtained are summarized in Table 6. The dispersion ratings for all the products are similar indicating that the dry drum products represent suitable feeds for forming masterbatches.

TABLE 6

Dispersion Quality (AFNOR Rating) Of Masterbatches formed from Pelletized Products

| Product of Example No | Black Loading, % | AFNOR Rating |
|---|---|---|
| 14 | 40.0 | 1.8 |
| 14 | 50.0 | 2.37 |

TABLE 6-continued

Dispersion Quality (AFNOR Rating) Of Masterbatches formed from Pelletized Products

| Product of Example No | Black Loading, % | AFNOR Rating |
|---|---|---|
| 15 | 44.2 | 2.13 |
| 16 | 42.9 | 2.38 |
| 17 | 50.7 | 2.46 |
| 18 | 40.0 | 2.38 |
| 18 | 50.0 | 2.63 |
| 19 | 45.6 | 2.46 |
| 20 | 33.5 | 2.12 |

The utility of the products of Table 5 for the direct incorporation of 2.5 weight % carbon black in HDPE in a Banbury mixer under identical mixing conditions was also investigated. Dispersion quality was evaluated using the AFNOR procedure and the results obtained are given in Table 7.

TABLE 7

Dispersion Quality (AFNOR Rating) After Direct Addition To A 2.5 Weight % Black Loading In HDPE

| Products of Example No | AFNOR Rating |
|---|---|
| 14 | 10.3 |
| 15 | 2.92 |
| 16 | 3.18 |
| 17 | 3.42 |
| 18 | 9.25 |
| 19 | 5.17 |
| 20 | 2.17 |

The data in Table 7 show that direct addition of the dry drum co-pelletized carbon black/polymer product to HDPE in a Banbury mixer gives better quality dispersions than those attained with the wet process pellets. These results demonstrate the superior dispersibilities of the products produced by the process of the present invention. However, as already noted, the dry pelletized products formed at ambient temperatures are prone to dustiness.

EXAMPLES 21–28

Hot Rolling Carbon Black/Polymer Seed Pellets

The effects of heating in a dry drum pelletizing process was simulated by rolling the dry drum pelletized products in an indirectly heated 0.56 m (22-inch) diameter by 0.56 m (22-inch) long drum at about 6 RPM. 18.9 liters (5 gallons)

of the products of Examples 16, 19 and 20 were placed in the cold drum and heating was commenced until a specified bed temperature was attained after which heating was terminated. Rolling was continued until the bed temperature declined to about 70° C. The total rolling time was about 2 hours, a time similar to the mean residence time of pellets in conventional dry drums. The properties of the resultant pellets are summarized in Table 8. Their dispersibilities were determined after dispersion of the pelletized products in polyethylene at a 2.5% black loading in a laboratory Brabender mixer at fixed conditions (190° C. chamber temperature, 72% volume fill, 30 RPM, 4 minute mixing time).

TABLE 8

Effect of Hot Rolling

| Example No. | Product of Example | [b]Max. Temp. C. | MPS kg | Mean Size mm | 5 Min. Dust % | 15 Min. Dust % | Tap Density g cc | Dispersion Rating |
|---|---|---|---|---|---|---|---|---|
| 16 | 16 | NH[a] | 2.7 | 0.54 | 19.1 | 25.5 | 0.399 | 1 |
| 21 | 16 | 210 | 30 | 0.76 | 8.35 | 8.91 | 0.442 | 1C |
| 22 | 16 | 266 | 35 | 0.76 | 3.09 | 3.63 | 0.513 | 1D |
| 19 | 19 | NH | 3.2 | 0.75 | 20.3 | 26.5 | 0.417 | 1 |
| 23 | 19 | 182 | 13 | 0.95 | 5.03 | 9.41 | 0.506 | 1B |
| 24 | 19 | 210 | 28 | 0.76 | 13.8 | 14.6 | 0.527 | 1C |
| 25 | 19 | 238 | 32 | 1.02 | 5.99 | 6.67 | 0.512 | 1C |
| 20 | 20 | NH | 2.7 | 0.70 | 16.1 | 17.3 | 0.428 | 1 |
| 26 | 20 | 121 | 27 | 0.86 | 6.76 | 9.98 | 0.434 | 1 |
| 27 | 20 | 177 | 16 | 0.75 | 3.59 | 4.05 | 0.552 | 1 |
| 28 | 20 | 210 | 20 | 0.70 | 2.76 | 3.05 | 0.536 | 1D |

[a]NH = Not Heated ("as is" dry drum pelletized sample);
[b]Specified temperature to which the rolling bed was heated.

The results in the table show that rolling at elevated temperatures, above the softening or melting point of the HDPE polymer, serves to markedly increase pellet strength and attrition resistance. Pellet density and, to a certain extent, mean pellet sizes also increase. Pellet dispersibility, on the other hand, is somewhat degraded. Nevertheless, their dispersibilities are comparable to those attained with the wet process pellets under identical dispersion conditions. The dispersibility ratings for the wet process pellets were 2A (product of Example 14) and 1C (product of Example 18). The strength characteristics of the wet process pellets are presented in Table 5. These products have much lower strengths than the hot rolled products of Table 8.

EXAMPLES 29–31

Benefits of Rolling

The strength enhancement attained by heating the product of Example 19 at a specified temperature for one hour in a static bed was evaluated. The results obtained are presented in Table 9. They show that mass pellet strength rises with increase in the treatment temperature.

TABLE 9

Effect of Heat Treatment In A Static Bed

| Example No. | Treatment Temperature, C. | MPS, kg |
|---|---|---|
| 19 | ambient | 3.2 |
| 29 | 182 | 5.0 |
| 30 | 210 | 6.4 |
| 31 | 238 | 7.7 |

Comparison of the MPS results in Tables 8 and 9 for the products of Example 19 treated at the same temperatures (i.e, at 182° C. for Examples 23 and 29, at 210° C. for Examples 24 and 30 and 238° C. for Examples 25 and 31) show that the rolled products have substantially higher MPS values. Since the time period to which the pellets were subjected at the specified temperatures were much briefer in the rolling studies than in the static experiments, these studies show that the combination of rolling and heat treatment is much more effective in enhancing pellet strength than heat treating under static conditions. Further, the combination of rolling and heat treating can be practiced either after or during pellet formation. In the former case the pellets are formed in a first stage at ambient conditions and then hot rolled in a second stage. In the latter, and more preferable case, pelletization is effected in a heated dry drum.

EXAMPLES 32 AND 33

Dry Pelletization At Elevated Temperatures

Dry pelletizing was effected at elevated temperatures using two HDPE seed pellets having differing MFI values in the 0.30 m diameter drum. One HDPE, HDPE G38-70, was that used in previous examples, (e.g., as in Examples 19 and 20). In the present experiments, however, the product was screened to remove material less than 0.25 mm in size. The resulting material, having a mean size of about 0.85 mm and an MFI of about 1, was used as seed pellets. The second HDPE reactor crumb, DMDA-8965 NT 7, was produced by Union Carbide Chemicals and Plastics Co. The product had a MFI of 65 and, after grinding and screening, a mean size of 0.7 mm.

In the pelletization process, the fluffy black employed was that used in Examples 19 and 20 and had a DBP of 78 cc/100 g and a $I_2$ No. of 130 mg/g. To 400 g of seed pellets a total of 550 g of fluffy black was added and pelletizing was effected at 20 RPM at a final temperature of about 123° C. To prevent sticking of the seed pellets to themselves at elevated rolling temperatures, a portion of the fluffy black, about 150 g, was added to the seed pellets at ambient temperatures. The drum was rotated and heating was applied. During the heat up process (about 2.5° C./min.) an additional 100 g of black was added. At the final temperature of about 123° C., the remainder of the fluffy black was introduced and tumbling was continued for a further 50 to 70 minutes. Heating was discontinued and the contents of the drum were recovered after cooling. Their properties are summarized in Table 10.

TABLE 10

Pelletizing With Seed Pellets With Differing MFI Values at 123 C.

| Example No. | Seed Pellet MFI | Mean Pellet Size, mm | MPS kg | Tap Density g/cc |
|---|---|---|---|---|
| 32 | 1 | 0.79 | 27 | 0.41 |
| 33 | 65 | 0.75 | 33 | 0.56 |

The results in Table 10 show that pelletizing can be effected at elevated temperatures. In spite of its larger carbon black content and the use of a much smaller diameter drum, the product of Example 32 has a comparable density and a higher MPS value than the product of Example 20 formed at ambient temperatures and characterized in Table 8. Further, as shown by the larger MPS and tap density of the product of Example 33 than of Example 32 which were formed under similar temperature-time profiles, use of seed pellets with a larger MFI, at temperatures above the polymer softening or melting point, gives products with better handling properties.

The present results show that pelletization can be effected in a heated dry drum. In this procedure, seed pellets at temperatures below their softening or melting point are introduced into the front end of the heated dry drum together with all or, preferably, some of the fluffy black and, optionally, recycle pellets. In the preferred mode, the remainder of the fluffy black is added along the first half of the length of the dry drum. During the rolling process, the fluffy black adheres to the polymeric seed pellets while the seed pellet temperature rises above its softening or melting temperature. Under these conditions sticking of the softened seed pellets to each other is prevented. Instead, strength enhancement occurs as additional fluffy black adheres to the surfaces of the growing pellets.

EXAMPLES 34 TO 41

Pelletizing Titanium Dioxide And Zinc Oxide Powders

The feasibility of pelletizing submicron titanium dioxide and zinc oxide either alone or in combination with carbon black was investigated. For these purposes, the HDPE G38-70 seed pellets, having a mean size of 0.59 mm, were placed in the 0.394 m diameter laboratory scale dry drum. The drum was rotated and a powder or a mixture containing equal weights of the powder and a fluffy carbon black having a DBP of 78 cc/100 g and a $I_2$ No. of about 130 mg/g was slowly added to the tumbling bed of seed pellets. After addition of the powders was completed the bed was rotated for a further 1 to 4 hours. The powders used, their weights and the weights of seed pellets employed were:
a) Example 34: 400 g seed pellets and 400 g of titanium dioxide powder, particle size about 0.2 μm,
b) Example 35: 400 g seed pellets and 800 g of a mixture containing equal weights of titanium dioxide, particle size about 0.2 μm, and carbon black,
c) Example 36: 400 g seed pellets and 500 g of zinc oxide powder, particle size 0.12 μm,
d) Example 37: 500 g seed pellets and 800 g of a mixture containing equal weights of zinc dioxide, particle size 0.12 μm, and carbon black.

The submicron powders and powder mixtures were readily pelletized. The product of Example 35, 600 g, was rolled in the 0.3 m drum at 20 RPM and heated at a rate of about 2.5° C./min to 177° C., held at about 177° C. for 60 minutes and then heating was discontinued. After rolling for a further 60 minutes, the cooled product, Example 38, was removed from the drum. The product of Example 37, 600 g, was rolled and heated under similar conditions to give the product of Example 39.

The properties of the products formed with the submicron powders and mixture of powders are characterized in Table 11.

TABLE 11

Properties Of Pellets formed With Titanium Dioxide, Zinc Oxide and Their Mixtures With Carbon Black

| Example No. | Submicron Powder | Maximum Temp., C. | Mean Size, mm | MPS kg | Tap Density g/cc |
|---|---|---|---|---|---|
| 34 | TiO$_2$ | ambient | 0.55 | <5 | 0.69 |
| 35 | TiO$_2$/ªCB | ambient | 0.53 | 5 | 0.53 |
| 38 | TiO$_2$/CB | 177 | 0.57 | 42 | 0.62 |
| 36 | ZnO | ambient | 0.62 | 30 | 0.72 |
| 37 | ZnO/CB | ambient | 0.70 | <5 | 0.57 |
| 39 | ZnO/CB | 177 | 0.87 | 35 | 0.66 |

ªCB = Carbon Black

The results in the table show that the pellets formed with the submicron powders at ambient temperatures, other than in the case of Example 36, are relatively weak. In the case of the product of Example 36, consisting of a layer of zinc oxide on the polymer seed, the product has an MPS value which exceeds that attained with titanium dioxide. This may be attributed to the finer sized, more dense (4.26 and 5.6 g/cc for titanium dioxide and zinc oxide, respectively) zinc oxide particles forming a more dense and, hence, stronger pigment layer on the seed pellets.

Rolling of the oxide/carbon black powder compositions, at temperatures above the softening or melting point of the seed pellets, results in pellet strength enhancement and pellet densification. The product of Example 34 was also subjected to rolling at 177° C. In this case the pellets cohered into two large masses. The sticking of the pellets to themselves is attributed to the presence of a relatively low loading of the high density titanium dioxide having a low oil absorption. Use of either increased loadings of titanium dioxide and/or reduced rolling temperatures would have resulted in the formation of pellets having improved handling properties.

EXAMPLES 40 AND 41

Micron-Sized Calcium Carbonate

Attempts were made to dry pelletize micron-sized calcium carbonate either alone or after mixing with the submicron fluffy black used in Examples 35 and 37. The weight of powders and seed pellets used were as follows:
a) Example 40: 400 g seed pellets and 400 g of calcium carbonate powder, particle size about 10 μm, and
f) Example 41: 400 g seed pellets and 800 g of a mixture containing equal weights of calcium carbonate, particle size about 10 μm, and carbon black.

The pelletizing conditions employed were similar to those used for Examples 34 and 35. In the present case, however, minimal pellet formation occurred when the powder consisted either of the 10 μm calcium carbonate or its mixture with carbon black.

The foregoing embodiments are intended to illustrate and not limit the present invention. It will be apparent that various modifications can be made without departing from the spirit and scope of the invention as defined by the appended claims.

The invention claimed is:

1. A process for preparing co-pelletized submicron pigment powder/polymer products comprising the step of pelletizing a submicron pigment powder in a dry drum in the presence of thermoplastic polymeric seed pellets having a mean size in the range of 0.2 to 2.0 mm, wherein the submicron pigment powder to thermoplastic polymeric seed pellet weight ratio is in the range of 0.4:1 to 9:1.

2. A process of claim 1 wherein the submicron pigment powder is selected from the group consisting of carbon black, titanium dioxide, zinc oxide, antimony oxide, hydrated aluminum oxide and mixtures thereof.

3. A process of claim 1 wherein the submicron pigment powder is carbon black.

4. A process of claim 1 wherein the pelletizing process is conducted at a temperature above the melting or softening point of the thermoplastic polymeric seed pellets.

5. A process of claim 1 wherein the pelletizing process is conducted at a temperature above the softening or melting point of the thermoplastic polymeric seed pellets and at a temperature-time profile such that less than 5 weight % of the thermoplastic polymeric seed pellets is degraded.

6. A process of claim 1 wherein the pelletizing process is conducted at a temperature ranging from ambient up to the softening or melting point of the thermoplastic polymeric seed pellets and then, in a rotating drum, the resulting co-pelletized submicron pigment powder/polymer products are maintained at a temperature above the softening or melting point of the thermoplastic polymeric seed pellets for a period of 0.5 to 2 hours and wherein the temperature-time profile in the rotating drum is such that less than 5 weight % of the thermoplastic polymeric seed pellets is degraded.

7. A process for preparing co-pelletized submicron pigment powder/polymer products comprising the step of pelletizing a submicron pigment powder in a dry drum in the presence of thermoplastic polymeric seed pellets having a mean size in the range of 0.2 to 2.0 mm, wherein a fraction of the co-pelletized products is recycled and combined with the thermoplastic polymeric seed pellets to further seed the dry drum such that the weight ratio of submicron pigment powder to the total amount of thermoplastic polymeric and co-pelletized product seed pellets is in the range of 0.2:1 to 5:1.

8. A process of claim 7 wherein the submicron pigment powder is selected from the group consisting of carbon black, titanium dioxide, zinc oxide, antimony oxide, hydrated aluminum oxide and mixtures thereof.

9. A process of claim 7 wherein the submicron pigment powder is carbon black.

10. A process of claim 7 wherein the pelletizing process is conducted at a temperature above the melting or softening point of the thermoplastic polymeric seed pellets.

11. A process of claim 7 wherein the pelletizing process is conducted at a temperature above the softening or melting point of the thermoplastic polymeric seed pellets and at a temperature-time profile such that less than 5 weight % of the thermoplastic polymeric seed pellets is degraded.

12. A process of claim 7 wherein the pelletizing process is conducted at a temperature ranging from ambient up to the softening or melting point of the thermoplastic polymeric seed pellets and then, in a rotating drums, the resulting co-pelletized submicron pigment powder/polymer pellets are maintained at a temperature above the softening or melting point of the thermoplastic polymeric seed pellets for a period of 0.5 to 2 hours and wherein the temperature-time profile in the rotating drum is such that less than 5 weight % of the thermoplastic polymeric seed pellets is degraded.

13. A process for preparing a submicron pigment powder loaded masterbatch in a thermoplastic medium comprising the step of dispersing a co-pelletized submicron pigment powder/polymer product in the thermoplastic medium, wherein the co-pelletized submicron pigment powder/polymer product comprises a submicron pigment powder and a thermoplastic polymer having a submicron pigment powder to polymer weight ratio of 0.4:1 to 9:1.

14. A process of claim 13 wherein the submicron pigment powder is selected from the group consisting of carbon black, titanium dioxide, zinc oxide, antimony oxide, hydrated aluminum oxide and mixtures thereof.

15. A process of claim 13 wherein the submicron pigment powder is carbon black and wherein the carbon black to polymer weight ratio is in the range of 0.4:1 to 2:1.

16. A process of claim 13 wherein the co-pelletized submicron pigment powder/polymer product is predominantly a core-shell type.

17. A process for preparing a submicron pigment powder loaded thermoplastic polymeric composition comprising the step of introducing a co-pelletized submicron pigment powder/polymer product into a thermoplastic polymeric medium, wherein the co-pelletized submicron pigment powder/polymer product comprises a submicron pigment powder and a thermoplastic polymer having a submicron pigment powder to polymer weight ratio of 0.8:1 to 9:1.

18. A process of claim 17 wherein the submicron pigment powder is selected from the group consisting of carbon black, titanium dioxide, zinc oxide, antimony oxide, hydrated aluminum oxide and mixtures thereof.

19. A process of claim 17 wherein the submicron pigment powder is carbon black.

20. A process of claim 19 wherein the carbon black to polymer weight ratio is in the range of 0.8:1 to 3:1.

21. A process of claim 17 wherein the co-pelletized submicron pigment powder/polymer product is predominantly a core-shell type.

* * * * *